Nov. 20, 1962     D. M. ROCKWELL     3,064,673

PRESSURE RELIEF VALVE FOR PRESSURIZED CONTAINERS

Filed May 20, 1959     2 Sheets-Sheet 1

INVENTOR.
Dean M. Rockwell
BY
Parker & Buchmont
Attorneys.

Nov. 20, 1962 D. M. ROCKWELL 3,064,673
PRESSURE RELIEF VALVE FOR PRESSURIZED CONTAINERS
Filed May 20, 1959 2 Sheets-Sheet 2

INVENTOR.
Dean M. Rockwell
BY Parker & Purdman
Attorneys.

United States Patent Office 3,064,673
Patented Nov. 20, 1962

3,064,673
PRESSURE RELIEF VALVE FOR PRESSURIZED CONTAINERS
Dean M. Rockwell, 135 Oakland Place, Buffalo, N.Y.
Filed May 20, 1959, Ser. No. 814,485
5 Claims. (Cl. 137—494)

This invention relates to relief valve assemblies for use in connection with cylinders or other containers for fluids under pressure.

In containers of this kind a valve is used for controlling the supply of fluid to an appliance connected therewith and also there is provided a pressure relief valve which opens automatically if the pressure within the container becomes excessive.

It is an object of this invention to provide an improved construction for discharging fluid from the container when the pressure within the same becomes excessive.

Another object is to provide a device of this type in which excess pressure in the container is reduced by movement of the valve member which controls the supply of fluid to the appliance.

A further object is to provide an improved arrangement for the pressure relief valve in which a gasket which normally seals off the escape of fluid from the container is shifted when the pressure of fluid becomes excessive and by shifting uncovers an opening through which excess fluid is discharged.

Figure 1:
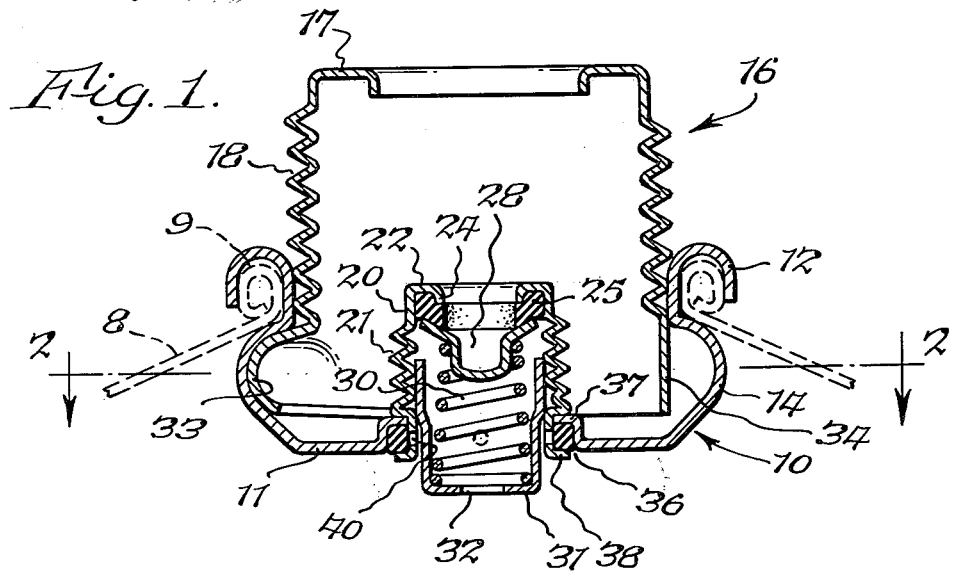
FIG. 1 is a central, sectional elevation of a valve assembly embodying this invention and showing the same applied to the upper part of the pressure container or cylinder.

In the particular construction illustrated in the drawings by way of example, I have shown a portion of the container in broken lines and designated by the reference character 8. Containers of this kind usually have a bead 9 extending about their open ends. The container shown by way of example is of the type which is discarded after the contents have been discharged from the same. The upper ends of these cylinders or containers are usually closed by means of a closure member or cup 10 having a bottom or base 11 and an outer, upwardly extending, substantially cylindrical peripheral wall provided at its upper end with an outwardly overturned flange 12 which is formed to fit over the bead 9 and which is preferably provided with an elastic sealing compound, not shown, between the inner surface thereof and the bead 9 to form a leakproof joint between the containers and the closure cup 10. This cup extends to a limited extent into the interior of the container or cylinder 8. The cylindrical side wall of the closure member is deformed by pressing the same outwardly by means of a suitable tool into engagement with the inner surface of the conical upper portion of the container so as to hold the flange 12 in sealing engagement with the bead 9. In the construction shown for this purpose the side wall is pressed outwardly at the parts 14, but it will be understood that any number of bowed-out parts may be provided or the side wall may be bowed outwardly throughout its periphery. The closure cup 10 is consequently securely locked on the container. Any other means for securing the cup or closure member on the container may be provided.

I have illustrated my invention as used in connection with a valve adapter 16 through which an appliance may be connected with the container 8, but it will be understood that my invention may be employed with pressurized containers used without appliances. The valve adapter shown is of hollow, cylindrical form having an inwardly extending flange 17 at the upper end and through which a valve actuating part of the appliance (not shown) extends. The valve adapter 16 is provided with screw threads 18 formed to cooperate with corresponding threads of the appliance which extend into gripping contact with the portion 12 of the valve cup to form a secure connection between the appliance and the container.

The valve for discharging gas or other fluid from the container includes a valve cup 20 which is of approximately cylindrical form and which is formed as a separate piece from the adapter and which may be connected therewith through suitable sealing means not shown to form a gas-tight joint between the valve cup and an appliance. The valve cup shown is provided with threads 21 on the exterior surface thereof. This valve cup has an inwardly extending flange 22 provided with a downwardly extending edge 24 which confines an annular gasket 25 which also serves as a valve seat. The appliance to which this valve may be used has a part extending downwardly into and forming a gas-tight fit with the gasket 25.

The valve includes a movable member 28 which is in the form of a cup having outwardly extending parts or flanges engaging the valve seat 25, and this valve member 28 is urged upwardly into closing position by means of a spring 30 and also by pressure of fluid in the container. The spring 30 is held in its operative position by means of a spring-retaining cup 31 provided with an opening 32 in its bottom through which fluid from the container can pass into the valve cup 20. This spring cup is held in place in any suitable manner in relation to the valve cup 20, for example, by frictional engagement with the threaded portion of the valve cup.

The connection between the valve cup and closure cup may be formed in any suitable manner and in the construction shown the lower end of the valve cup cooperates with an annular gasket or seal 36 which is retained between an annular, inwardly extending part 37 of the closure cup 11 and an outwardly extending flange 38 of the valve cup 21. The gasket 36 is made of a resilient, compressible or deformable material such, for example, as a rubber, sponge rubber or a rubber-like material which is compressible or deformable between the flanges 37 and 38. The seal 36, when in normal position, covers fluid discharge or escape openings and partly uncovers such escape openings when the valve cup is moved by pressure in the container in excess of that desired. For example, in the construction shown, the lower end of the valve cup has one or more discharge passages or holes 40 formed therein, which holes are normally closed by the gasket or sealing member 36.

In the operation of this pressure relief valve, when the pressure in the container acts on the valve member 21, this member moves upwardly, thus compressing the gasket member 36. When the pressure exceeds that desired, the gasket 36 is moved into the position shown in FIG. 3, in which case the opening 40 in the valve member will be exposed so that fluid from the container will pass through the discharge passages 40 and into the space between the lower portion of the adapter 16 and the outwardly bulging portions of the cup 11 and will then pass into the space between the threads of the screw threaded part 18 to the atmosphere. In this construction the cup 11 is made of fairly rigid material so that it will hold the upper face of the gasket or seal 36 in substantially fixed relation to the other parts of the mechanism, while the lower part of the valve cup is being moved upwardly so that the openings or holes 40 are uncovered by being moved above the upper edge of the gasket.

The gas discharged through the openings 40 may be discharged from the interior of the closure cup 14 by passing around the threads 18 of the adapter; and to facilitate passage of the gas to these threads, the adapter 16 is secured to the closure cup by pressing outwardly certain peripheral parts 33 of the adapter into contact with the closure cup and omitting the pressing of the parts 34 outwardly thus forming a space between the parts 34 and the closure cup 14 through which the gas can readily pass to the screw threads of the adapter. Any other means for providing discharge passages for the gas may be provided.

It will be understood that when the valve cup is moved vertically by variations in pressure in the container, the usual actuating members (not shown) for the valve 28 will be slidably maintained in gas-tight relation to the valve cup by the gasket 25.

Figure 4:
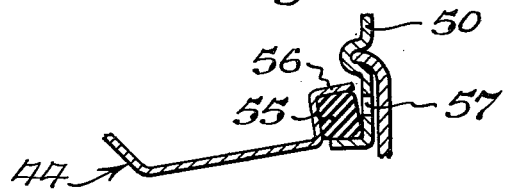
FIG. 4 is a similar sectional elevation showing another form of pressure relief valve in open or fluid-discharging position.
Figure 5:
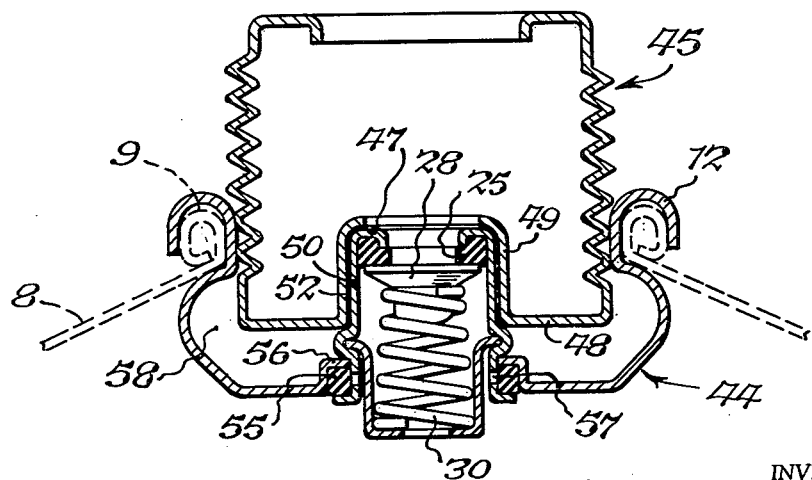
FIG. 5 is a central, sectional elevation of a valve construction of modified form.

In the modified construction shown in FIGS. 4 and 5, the closure cup 44 is made of less rigid material so that the lower, flat portion thereof may be flexed upwardly as shown in FIG. 4. Means are provided for mounting the valve cup 47 so that it may move vertically with variations in pressure. This may be accomplished by means of a sliding fit between the threads of the adapter 45 and the upper part of the closure cup 44, or by making the valve adapter 45 of a relatively flexible material. The adapter has a gas-tight connection with the valve cup 47, which connection, for example, may be formed by providing the valve adapter at the lower portion thereof with an upwardly extending flange 49 curled inwardly at the upper end thereof. The valve cup 47 has a cylindrical part 50 suitably secured within the upwardly extending, substantially cylindrical part 49 of the closure cup, for example, by means of a cement 52 arranged between the valve cup and the part 48 to form a gas-tight connection between these parts.

Figure 2:
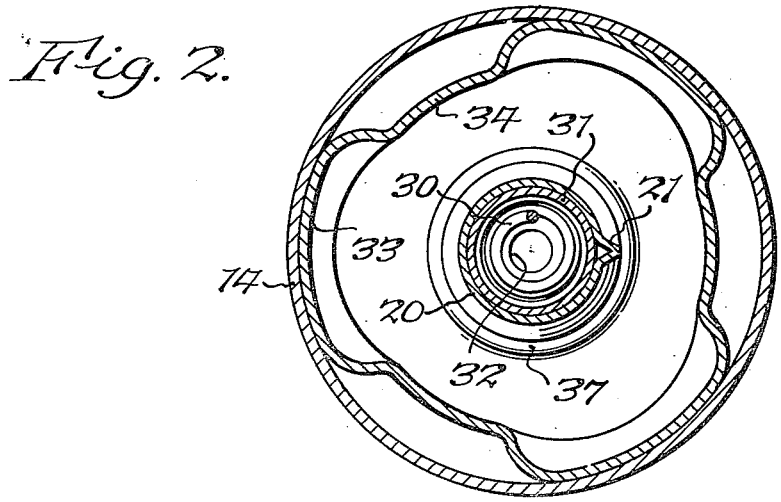
FIG. 2 is a sectional plan view thereof on line 2—2, FIG. 1.

A sealing member or gasket 55 is provided between the closure cup and the valve cup which is held between flanges of the valve cup and closure cup in approximately the same manner as described in connection with FIGS. 1–3. In this construction however, pressure acts on the lower face of the closure cup as well as on the valve itself and consequently as a result of this pressure the lower portion of the closure cup will be flexed into substantially frusto conical shape, so that the upper flange 56 of this closure cup which bears against the upper face of the gasket 55 will bend or stretch the gasket away from the fluid discharge or relief opening 57, as shown in FIG. 4, thus permitting excess fluid to flow through the opening 57 into a space 58 between the valve adapter and the closure cup, from which space it can pass outwardly between the usual threads of the valve adapter. Consequently, in this modified construction the gasket or seal 55 is not materially compressed but mainly flexed radially outwardly to open the discharge passages 57.

In both of these constructions shown, the discharge of fluid in case the pressure within the container becomes excessive is effected merely by the shifting of the valve cup relatively to the closure member so that the shifting of the cup uncovers openings through which excess fluid can be discharged. In the constructions illustrated this can be effected through the resulting deformation of he seal or gasket which connects the closure cup with the valve cup.

Figure 3:
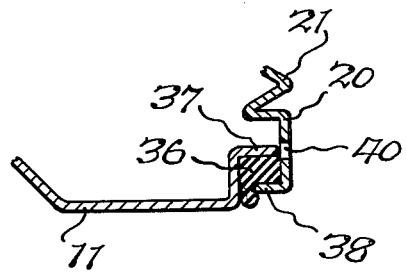
FIG. 3 is a fragmentary, sectional elevation thereof showing the operation of the relief valve when discharging fluid from said container.

While I have shown two ways of acting on the gasket or seal to effect release of pressure, it will be obvious that both of these ways of uncovering the discharge opening may be combined into one, namely by making the seal or gasket member of yielding material which is first deformed so as to permit the escape of fluid, as shown in FIG. 3, and upon further movement of the valve cup, due to excessive pressure in the container, the seal or gasket may be further moved outwardly or away from the discharge openings to permit a more rapid discharge of fluids.

It will be understood that various changes in the details, materials and arrangements of parts which have herein been described and illustrated in order to explain the nature of the invention may be made by those skilled in the art within the principle and scope of the invention as expressed in the appended claims.

I claim:

1. A valve assembly for use with a pressurized contaner for automatically relieving excess pressure, said valve assembly including a closure cup of annular form having a central opening, a valve cup extending through the opening in said closure cup and acted upon by pressure fluid shiftable relatively to said closure cup by said variations in said pressure, a sealing ring between said closure cup and said valve cup, said valve cup having an outwardly extending flange and said closure cup having an inwardly extending flange, said sealing ring being confined between said flanges, said valve cup having a discharge opening for fluid from a container and which is located between said flanges and is normally closed by said sealing ring, said sealing ring being made of flexible material and yieldingly opposing the movement of said valve cup by fluid pressure and being deflected out of its normal position by excess pressure to shift said sealing ring out of a position in which it covers said discharge passages.

2. A valve construction according to claim 1, in which said discharge passage is located adjacent to the upper edge of said sealing ring in position to be partly uncovered by deflection of said sealing ring when the pressure of fluid becomes excessive.

3. A valve assembly for use on a pressurized container for automatically relieving excess fluid pressure, said valve assembly including a closure cup of annular form having a central opening, a valve cup extending through the opening in said closure cup and acted upon by pressure fluid and shiftable axially relatively to said closure cup by variations in said pressure, a sealing ring between said closure cup and said valve cup and forming a gas-tight seal between said cups, said cups having flanges extending one above the other and between which said sealing ring is positioned, said valve cup having a discharge opening therein between said flanges, said sealing ring normally extending across said opening to close the same, said valve cup when shifted by excessive pressure compressing said sealing ring between said flanges to move the same out of closing relation to said opening.

4. A valve assembly for use on a pressurized container for automatically relieving excess fluid pressure, said valve assembly including a closure cup of annular form having a central opening, a valve cup secured in said opening in said closure cup and subjected to pressure fluid, and a flexible sealing ring forming a gas-tight seal between said closure cup and said valve cup, said cups having flanges arranged one above the other and between which said sealing ring is positioned, said valve cup having a fluid discharge opening between said flanges which is normally closed by said sealing ring, said valve cup when shifted by excessive pressure compressing said sealing ring between said flanges to move the same out of closing relation to said opening.

5. A valve assembly for use with a pressurized container for automatically relieving excess fluid pressure, said assembly including a closure cup, a valve cup slidably mounted relatively to said closure cup in position to be acted upon and moved by fluid pressure, a yieldable sealing ring, said valve cup and said closure cup having projecting parts between which said sealing ring is confined to form a gas-tight seal between said valve cup and said closure cup when the pressure acting on said valve cup is not more than desired, said sealing ring being deformed by excessive movement of said valve cup relative to said closure cup when resulting from exposure to pressure greater than that desired, and a discharge passage in said valve cup between said projecting parts and which is normally closed by said yieldable sealing ring and which is opened when said sealing ring is deformed due to excess pressure on said valve.

References Cited in the file of this patent

UNITED STATES PATENTS

| | | |
|---|---|---|
| 340,650 | Young | Apr. 27, 1886 |
| 1,010,792 | Page | Dec. 5, 1911 |
| 1,668,891 | Dudley | May 8, 1928 |
| 2,247,734 | Schreiber | July 1, 1941 |
| 2,757,964 | Both et al. | Aug. 7, 1956 |

FOREIGN PATENTS

| | | |
|---|---|---|
| 495,754 | Belgium | Sept. 16, 1950 |